(12) United States Patent
Blackburn et al.

(10) Patent No.: US 6,352,747 B1
(45) Date of Patent: Mar. 5, 2002

(54) SPIN AND SPRAY COATING PROCESS FOR CURVED SURFACES

(75) Inventors: William P. Blackburn, Safety Harbor; Robert J. Bowles, III, Palm Harbor; Michael B. Levesque, Clearwater; Ernesto Maldonado, Palm Harbor, all of FL (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/515,661

(22) Filed: Feb. 29, 2000

Related U.S. Application Data

(60) Provisional application No. 60/127,027, filed on Mar. 31, 1999.

(51) Int. Cl.[7] .............................. B05D 1/02; B05D 5/06
(52) U.S. Cl. ................... 427/425; 427/162; 427/163.1; 427/164; 427/240; 118/52; 118/320
(58) Field of Search .............................. 427/160, 162, 427/163.1, 164, 240, 385.5, 389.7, 393.5, 425; 118/52, 320

(56) References Cited

U.S. PATENT DOCUMENTS

| 3,361,706 A | 1/1968 | Meriwether et al. .......... 260/39 |
|---|---|---|
| 3,494,326 A | 2/1970 | Upton .......................... 118/50 |
| 4,267,212 A | 5/1981 | Sakawaki .................... 427/240 |
| 4,931,220 A | 6/1990 | Haynes et al. .............. 252/586 |
| 5,094,884 A | 3/1992 | Hillman et al. .............. 427/240 |
| 5,130,353 A | 7/1992 | Fischer et al. ................. 524/43 |
| 5,246,499 A | 9/1993 | Peralta et al. ................ 118/641 |
| 5,336,320 A | 8/1994 | Hogan et al. ................ 118/300 |
| 5,366,757 A | 11/1994 | Lin ................................. 427/9 |
| 5,514,214 A | 5/1996 | Joel et al. ...................... 118/52 |
| 5,571,560 A | 11/1996 | Lin ............................. 427/240 |
| 5,645,767 A | 7/1997 | Van Gemert ................ 252/586 |
| 5,658,501 A | 8/1997 | Kumar et al. ................ 252/586 |
| 5,670,210 A | 9/1997 | Mandal et al. .............. 427/240 |
| 5,685,908 A | 11/1997 | Brytsche et al. .............. 118/52 |
| 5,695,817 A | 12/1997 | Tateyama et al. ........... 427/240 |
| 5,753,301 A | 5/1998 | Brytsche et al. ............ 427/162 |
| 5,766,354 A | 6/1998 | Ohmori et al. ............. 118/319 |
| 5,902,399 A * | 5/1999 | Courtenay .................... 118/52 |
| 6,013,315 A * | 1/2000 | Mandal ....................... 427/240 |
| 6,025,026 A * | 2/2000 | Smith et al. ................. 427/316 |
| 6,042,737 A * | 3/2000 | Basil et al. .................... 216/37 |

FOREIGN PATENT DOCUMENTS

| EP | 0643334 A1 | 3/1995 |
|---|---|---|
| GB | 327 629 A | 2/1999 |
| WO | WO 95/07764 | 3/1995 |
| WO | WO 98/57757 | 12/1998 |

OTHER PUBLICATIONS

Customer Product Manual Part 303 776A, Nordson Corp, "Select Coat® Slim Swirl Applicator", 9/97.
*Encyclopedia of Chemical Technology*, Kirk–Othmer, 4th Ed., vol. 6, "Coatings" pp 669–760, 1993 (no month).
*Paint/Coatings Dictionary*, Published by Federation of Societies for Coatings Technology, 1978 (no month).
Patent Abstracts of Japan, Pub. No. 58001144, Pub. Date Jun. 01, 1983, Method for Coating Photoresist.
D.E. Bornside et al.: "On the Modeling of Spin Coating", Journal of Imaging Technology, vol. 13, No. 4, Aug. 1987, pp. 122–130, XP002148497.

* cited by examiner

*Primary Examiner*—Shrive P. Beck
*Assistant Examiner*—Jennifer Calcagni
(74) *Attorney, Agent, or Firm*—Frank P. Mallak

(57) ABSTRACT

Described is an process for producing uniform coatings on circular substrates that reduces the amount of coating required. The improved process includes the steps of applying the liquid coating material through a single opening of a dispenser having certain characteristics, in a pattern onto the center of a spinning substrate, and then radially moving the dispenser opening near to the edge of the substrate while maintaining the dispenser opening at a predetermined distance from the substrate surface for substantially the entire radius of the substrate providing uniform coverage. Also described are products produced by the process that are substantially free of cosmetic defects and may be photochromic.

14 Claims, No Drawings

SPIN AND SPRAY COATING PROCESS FOR CURVED SURFACES

CROSS REFERENCE TO RELATED APPLICATIONS

This application claims priority to Provisional Application Ser. No. 60/127,027 filed Mar. 31, 1999.

DESCRIPTION OF THE INVENTION

The present invention relates to a process for producing uniform coatings on circular substrates and the coated substrates produced by the process. In particular, the present invention is directed to an improved spin and spray coating process that optimizes the use of coating materials. More particularly, the present invention relates to efficiently producing optical elements having uniform coatings or imbibed areas containing photochromic compounds. Further, the coated optical elements meet commercially acceptable "cosmetic" standards for optical coatings applied to optical elements, e.g., lenses.

Photochromic compounds exhibit a reversible change in color when exposed to light radiation involving ultraviolet rays, such as the ultraviolet radiation in sunlight or the light of a mercury lamp. Various classes of photochromic compounds have been synthesized and suggested for use in applications in which a sunlight-induced reversible color change or darkening is desired.

In recent years, photochromic articles, particularly photochromic plastic materials for optical applications, have been the subject of considerable attention. In particular, photochromic ophthalmic plastic lenses have been investigated because of the weight advantage they offer, vis-à-vis, glass lenses. Moreover, photochromic transparencies for vehicles, such as cars and airplanes, have been of interest because of the potential safety features that such transparencies offer.

Methods for producing uniform coatings on substrates have been disclosed in numerous patents. U.S. Pat. No. 3,494,326 describes a spin-coating machine that includes a sealed compartment and means for providing a pressure differential in the area of the spinning lens. The controlled withdrawal and flow of air around the spinning lens due to the pressure differential reportedly enables providing a uniform coating on certain elongated lens shapes.

U.S. Pat. No. 5,094,884 describes an apparatus for applying a uniform layer of a fluid material on a substrate by using a dispensing nozzle having a rectangular or oblong shaped opening. The fluid material is dispensed while the nozzle moves along a radial path inwardly from the peripheral edge of the substrate.

U.S. Pat. No. 5,246,499 describes a coating system for applying a scratch-resistant coating to plastic ophthalmic lenses. The coating station of this system includes a coating arm assembly having nozzles which can be moved radially inwardly and outwardly over spinning lenses to apply the coating solution.

U.S. Pat. No. 5,514,214 describes an apparatus for and method of applying a UV curable monomer to the surface of an ophthalmic lens or mold. The substrate is sprayed with a UV curable solution while spinning at a high rate of speed to achieve a uniform coating. The coated substrate is then moved to a curing chamber to polymerize the monomer on the lens or mold.

U.S. Pat. No. 5,571,560 describes a method of coating a substrate that minimizes waste using a proximity dispenser that dispenses a liquid coating in the form of a stream from nozzles placed from 5 to 10 mm above the substrate.

U.S. Pat. No. 5,685,908 describes an apparatus for coating multifocal lens elements. The coating solution is applied using a nozzle that may be tilted while the lens is spun about an axis offset from the geometric center.

U.S. Pat. No. 5,766,354 describes a spin-coating device having the means to position the substrate at a predetermined angle while the fluid coating is dropped onto the rotating substrate.

A process has now been discovered for coating a substantially circular substrate with a liquid coating material dispensed onto the surface of a spinning substrate through a dispenser positioned above the substrate surface in a pattern which forms a uniform coating and reduces the amount of coating required. The improved process comprises the steps of applying the liquid coating material through a single opening in the dispenser onto the substantial center of the spinning substrate, and then moving radially the dispenser opening to near to the edge of the substrate while maintaining the dispenser opening at a predetermined distance from the substrate surface for substantially the entire radius of the substrate.

DETAILED DESCRIPTION

The dispenser used in the process of the present invention is one that produces a pattern having greater than 90%, preferably greater than 95%, and more preferably, greater than 99% of the dispensed material within the boundaries of the pattern. The term "pattern" as used herein describes a cross-section of the droplets and/or fluidized stream dispensed from the nozzle in a plane perpendicular to the direction of the discharge from the nozzle. Typically, the pattern may have an outside diameter of 1.2 inches (3 cm) when the coating material is dispensed through a single opening at a distance of from 0.3 to 0.6 inches (0.76 to 1.52 cm) from the substrate. Preferably, the pattern has an outside diameter of up to 1 inch (2.54 cm) when the distance is from 0.37 to 0.5 in (0.94 to 1.27 cm) and more preferably, the pattern appears as a ring having an uncoated inside circular region of about 0.4 inches (1.0 cm). Any type of disperser that produces the desired pattern may be used.

Preferably, the dispenser used in the process of the present invention is a Select Coat® Slim Swirl Applicator fitted with a swirl nozzle. This dispenser is described in U.S. Pat. No. 5,336,320 and Customer Product Manual, Part 303776A from the Nordson Corporation, both of which are incorporated herein by reference. The diameter of the aforementioned swirl nozzle may range from at least 0.008 inches (0.02 cm) preferably, at least 0.016 inches (0.04 cm) and more preferably, at least 0.020 inches (0.05 cm) to not more than 0.050 inches (0.13 cm), preferably, not more than 0.040 inches (0.1 cm) and most preferably, not more than 0.030 inches (0.076 cm). The diameter of the swirl nozzle used may range between any combination of these values, inclusive of the recited values.

In addition to the single opening in the swirl nozzle for dispensing fluid, there are 12 air holes angled toward the fluid discharged from the nozzle. The amount of air supplied to the dispenser has an effect on the pattern formed. For example, a fluid stream forming amount of air under pressure, i.e., an amount of air that does not cause the atomization or formation of individual droplets, e.g., from 1 to 3 pounds per square inch (psi) ($6.89 \times 10^3$ to $2.07 \times 10^4$ Newtons per meter$^2$ (N/m$^2$)) produces a coating pattern having a donut or ring-like pattern, whereas an atomizing amount of air pressure, e.g., greater than 10 psi ($6.89 \times 10^4$ $N/m^2$), produces a filled-in circular pattern.

In the process of the present invention, the dispenser is attached to a means for moving it vertically and horizontally, such as a robotic arm. The radial horizontal movement of the robotic arm may be accomplished using a telescopic movement or by using a fixed arm that swings in an arc over the spinning substrate. The angle at which the dispenser is maintained during application of the coating material ranges from perpendicular to the substrate to 45 degrees from perpendicular to the substrate.

A programmable logic controller (PLC) may be used to coordinate the movement of the dispenser, the supply of the coating material and the rotation of the substrate. In one contemplated embodiment, a controller is used to move the dispenser over the substantial center of the substrate, spin the substrate at a first speed to wet the surface, e.g., from 100 to 500 rpm, initiate the dispensing of coating material, move the dispenser radially from the center to the edge of the substrate while maintaining a distance of from 0.3 to 0.6 inches (0.76 to 1.52 cm) to the substrate surface, and spin the coated substrate at a second speed to form a uniform coating, e.g., from 500 to 3000 rpm. The controller may also direct the placement and removal of substrates from a substrate holder attached to means for rotating the substrate at variable speeds. Depending on the type of coating to be formed, all of the coating equipment may be placed in an enclosure in which the temperature, relative humidity and dirt level are controlled to optimize use of the coating material and minimize the potential for cosmetic defects. Regarding the dirt level, it is preferred that he coating operation take place in an environment having less than 100 dirt particles per cubic meter and more preferably, less than 10 dirt particles per cubic meter, i.e., a Class 10 environment.

In another contemplated embodiment, the procedure of the previous embodiment is followed except that dispensing of the coating material is started at the edge and moved radially toward the substantial center of the substrate.

In a further contemplated embodiment, the process of the present is used to apply a coating to a lens mold surface. Lens forming materials are then placed into the mold to form the lens. The coating adheres more strongly to the lens material than to the mold surface, such that a coated lens can be removed from the mold.

The process of the present invention may be used to form various coatings and layers on substrates, such as polymeric coatings or layers on optical elements, e.g., photochromic coatings on lenses or on the molds for making such lenses, photochromic coatings for imbibition or thermal transfer processes that imbibe or transfer the photochromic compounds from the surface of the substrate into the substrate, e.g., to a depth of from 1 to 250 microns from the surface, preferably, from 5 to 200 microns and more preferably from 10 to 150 microns, protective coatings such as hardcoats, e.g., abrasion resistant coatings, or antireflective coatings on polymeric substrates. It is also envisioned that the process of the present invention may be used to optimize the coating material used in processes involving the spin coating of any substantially circular substrate, particularly, substrates having a non-flat surface, e.g., a curved or uneven surface.

The polymeric coatings that may be applied by the process of the present invention include compositions resulting in thermoplastic or thermosetting coatings, which are described in the *Kirk-Othmer Encyclopedia of Chemical Technology*, Fourth Edition, Volume 6, pages 669 to 760, which description is incorporated herein by reference. The coating applied to the substrate may be a coating comprising at least one polymer obtained from a member selected from the group consisting of polyurethanes, aminoplast resins, polyanhydrides, alkoxyacrylamides, organosilanes, polyvinyl alcohol, poly(meth)acrylates, polyamide resins, epoxy resins, hydroxy ($C_2$–$C_3$) alkyl cellulose and poly(vinylpyrolidone). Preferably, the polymeric coating is a photochromic polymeric coating. Various additives such as dyes, leveling agents, flow control agents and other specific materials, which serve their intended purpose, may be added to the coating composition.

Photochromic compounds that may be utilized in the aforedescribed polymeric coatings that may be applied by the process of the present invention include organic photochromic compounds. These photochromic compounds may be incorporated, e.g., dissolved or dispersed, in the polymeric coating composition(s) used to prepare the coatings. The photochromic compounds may be used individually or in combination with other complementary photochromic compounds, i.e., organic photochromic compounds having at least one activated absorption maxima within the range of between about 400 and 700 nanometers, or substances containing same. Such photochromic compounds or mixtures of such photochromic compounds color when activated to an appropriate or desired hue.

More particularly, the organic photochromic compounds comprise:
 (a) at least one photochromic organic compound having a visible lambda max of from 400 nanometers to 525 nanometers; and
 (b) at least one photochromic organic compound having a visible lambda max of from greater than 525 nanometers to 700 nanometers.

Examples of suitable photochromic compounds for use in the polymeric coatings include benzopyrans, naphthopyrans, e.g., naphtho[1,2-b]pyrans and naphtho[2,1-b]pyrans, phenanthropyrans, quinopyrans, benzoxazines, naphthoxazines, spiro(indoline)pyridobenzoxazines and indeno-fused naphthopyrans disclosed in U.S. Pat. No. 5,645,767. Specific examples include the novel naphthopyrans of U.S. Pat. No. 5,658,501 and the complementary organic photochromic substances disclosed in this patent from column 11, line 57 through column 13, line 36. Other photochromic substances contemplated for use herein are the photochromic metal-dithizonates, e.g., mercury dithizonates which are described in, for example, U.S. Pat. No. 3,361,706; and fulgides and fulgimides, e.g. the 3-furyl and 3-thienyl fulgides and fulgimides, which are described in U.S. Pat. No. 4,931,220 at column 20, line 5 through column 21, line 38 and mixtures of the aforementioned suitable photochromic substances.

The disclosures relating to such photochromic compounds in the aforedescribed patents are incorporated herein, in toto, by reference. The photochromic coatings of the present invention may contain one photochromic compound or a mixture of photochromic compounds, as desired. Mixtures of photochromic compounds may be used to attain certain activated colors such as a near neutral gray or brown. Further discussion of neutral colors and ways to describe such colors is found in U.S. Pat. No. 5,645,767 column 12, line 66 to column 13, line 19.

The amount of the photochromic substances described herein to be used in the coating applied by the process of the present invention is an amount sufficient to produce a photochromic effect discernible to the naked eye upon activation. Generally such amount can be described as a photochromic amount.

The relative amounts of the aforesaid photochromic compounds used will vary and depend in part upon the relative intensities of the color of the activated species of such compounds, and the ultimate color desired. Generally, the amount of photochromic substance incorporated into the coating composition may range from 0.1 to 40 weight percent based on the weight of the solids in the coating composition. Preferably, the concentration of photochromic substances ranges from 1.0 to 30 weight percent, more preferably, from 3 to 20 weight percent, and most preferably, from 5 to 15 weight percent, e.g., from 7 to 14 weight percent.

The photochromic compound(s) described herein may be incorporated into the coating composition by dissolving or dispersing the photochromic substance within an individual component of or a mixture of the polymer-forming or polymeric coating composition; and/or by dissolving it in solvent before adding it to the coating composition. The photochromic polymeric coating may also be used as a transfer medium in a subsequent imbibition or permeation processing step. A process for incorporating a photochromic compound by thermal diffusion into a synthetic organic host material is described in U.S. Pat. No. 5,130,353 which is incorporated herein by reference.

The process of the present invention may be used to more efficiently produce uniform coatings on substantially circular substrates of any type such as, for example glass, ceramics, metals and polymeric organic materials. Preferably, the substrate is a polymeric organic material, particularly, thermoset and thermoplastic polymeric organic materials, e.g., thermoplastic polycarbonate type polymers and copolymers and homopolymers or copolymers of a polyol(allyl carbonate) used as organic optical materials.

It is typical to treat the surface of the substrate prior to using the process of the present invention for the purposes of cleaning the surface and promoting adhesion. When the photochromic coating is used to imbibe the substrate, methods for etching the substrate may be included to make the surface more receptive to the imbibition of photochromic compounds. Cleaning of the plastic surface may be accomplished by washing the surface with an aqueous solution of a detergent specifically designed for cleaning such plastics. The cleaning step may be done manually or in an automated unit such as a Westek Cleaning System.

Effective treatment techniques for plastics, such as those prepared from CR-39@ diethylene glycol bis(allyl carbonate) monomer or thermoplastic polycarbonate, e.g., a resin derived from bisphenol A and phosgene, include ultrasonic cleaning; washing with an aqueous mixture of organic solvent, e.g., a 50:50 mixture of isopropanol: water or ethanol: water; UV treatment; activated gas treatment, e.g., treatment with low temperature plasma or corona discharge, and chemical treatment such as hydroxylation, i.e., etching of the surface with an aqueous solution of alkali, e.g., sodium hydroxide or potassium hydroxide, that may also contain a fluorosurfactant. See U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of polymeric organic materials.

The treatment used for cleaning the glass surfaces of lenses and lens molds will depend on the type of dirt present on the glass surface. Such treatments are known to those skilled in the art. For example, washing the glass with an aqueous solution that may contain a low foaming, easily rinsed detergent, followed by rinsing and drying with a lint-free cloth; and ultrasonic bath treatment in heated (about 50° C.) wash water, followed by rinsing and drying. Pre-cleaning with an alcohol-based cleaner or organic solvent prior to washing may be required to remove adhesives from labels or tapes.

The process of the present invention may be used to apply a primer to the surface of the substrate before application of the polymeric coating composition. The primer serves as a barrier coating to prevent interaction of the coating ingredients with the substrate and vice versa, and/or as an adhesive layer to adhere the coating composition to the substrate. The use of protective coatings, some of which may contain polymer-forming organosilanes, as primers to improve adhesion of subsequently applied coatings has been described. In particular, the use of non-tintable coatings is preferred. Examples of commercial coating products include SILVUE 124 and HI-GARD coatings, available from SDC Coatings, Inc. and PPG Industries, Inc., respectively.

In addition, depending on the intended use of the coated article, it may be necessary to apply an appropriate protective coating(s), i.e., an abrasion resistant coating onto the exposed surface of the coating composition to prevent scratches from the effects of friction and abrasion. In some cases, the primer and protective coatings are interchangeable, i.e., the same coating may be used as the primer and the protective coating(s). Other coatings or surface treatments, e.g., a tintable coating, antireflective surface, etc., may also be applied to the cured coating using the process of the present invention or by another means. Coating operations may be done by a coater such as the SCS Spin Coater Model 6708 from Specialty Coating Systems, Inc.

The process of the present invention may be used to produce coatings of different thicknesses on substrates. This may be accomplished by applying and curing a single coating or by repeating this step until the desired thickness is obtained. The thickness of a singularly applied coating may range from at least a monomolecular layer, preferably, at least 1 micron, more preferably, at least 5 microns, and most preferably at least 15 microns to not more than 50 microns, preferably, not more than 40 microns, more preferably, not more than 30 microns and most preferably, not more than 25 microns. The thickness of the applied coating may range between any combination of these values, inclusive of the recited values. For example, the thickness of an applied coating may range from 18 to 22 microns.

Following application of the coating composition to the treated surface of the substrate, the coating is cured or dried, e.g., dried and heated to effect imbibition. Depending on the substrate and components selected for the polymeric coating composition, the coating may be cured or dried at temperatures ranging from 22 C. to 200° C. When heating is required to obtain a cured coating or to dry the coating and cause the thermal diffusion of the photochromic into the substrate, temperatures of between 80° C. and a temperature above which the substrate is damaged due to heating, e.g., 80° C. to 200° C., are typically used. For example, certain organic polymeric materials may be heated up to 135° C. for a period of 1 to 16 hours in order to cure the coating or imbibe the photochromic without causing damage to the substrate. While a range of temperatures has been described for curing and imbibing the coated substrate, it will be recognized by persons skilled in the art that temperatures other than those disclosed herein may be used.

Additional methods for curing the photochromic polymeric coating composition include irradiating the coating with infrared, ultraviolet, visible, thermal, microwave, gamma or electron radiation so as to initiate the polymerization reaction of the polymerizable components in the coating. This may be followed by a heating step.

Preferably, the resulting cured coating meets commercially acceptable "cosmetic" standards for optical coatings. Examples of cosmetic defects of coated lens include nonuniformity of the coating thickness, orange peel, pits, spotting, inclusions, cracking, crazing, ribbing and wrinkling of the coating. Definitions of these and other such coating defects are found in the Paint/Coatings Dictionary by Federation of Societies for Coatings Technology, Philadelphia, which disclosure is incorporated herein by reference. Most preferably, the cured coatings prepared using the process of the present invention are substantially free of cosmetic defects.

Examples of polymeric organic materials that may be substrates for the process of the present invention are polymers, i.e., homopolymers and copolymers, of the monomers and mixtures of monomers disclosed in U. S. Pat. No. 5,658,501 from column 15, line 28 to column 16, line 17, which is incorporated herein by reference.

Examples of such monomers and polymers include: polyol(allyl carbonate)monomers, e.g., diethylene glycol bis(allyl carbonate), which monomer is sold under the trademark CR-39; polyol(meth)acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol)bis methacrylate monomers; urethane acrylate monomers; poly(ethoxylated bisphenol A dimethacrylate); poly(vinyl acetate); poly(vinyl alcohol); poly(vinyl chloride); poly(vinylidene chloride); polyurethanes, polythiourethanes, thermoplastic polycarbonates, such as the carbonate-linked resin derived from bisphenol A and phosgene, which is sold under the trademark LEXAN; polyesters, such as the material sold under the trademark MYLAR; poly(ethylene terephthalate); polyvinyl butyral; and poly(methyl methacrylate), such as the material sold under the trademark PLEXIGLAS and mixtures thereof.

More particularly contemplated, is the use of the process of the present invention to produce photochromic polymeric coatings on optically clear polymerizates, i.e., materials suitable for optical applications, such as optical elements, e.g., plano and vision correcting ophthalmic lenses, windows, clear polymeric films, automotive transparencies, e.g., windshields, aircraft transparencies, plastic sheeting, etc. Such optically clear polymerizates may have a refractive index that may range from about 1.48 to about 1.75, e.g., from about 1.495 to about 1.66. Specifically contemplated are coated optical elements made of thermoplastic polycarbonates and thermoset polycarbonates having imbibed photochromic compounds.

Ophthalmic lens types that may be coated by the process of the present invention include finished single vision, semi-finished single vision, aspheric, progressive and segmented lenses such as bifocal and multifocal lenses. When applying an optical coating to a segmented lens, it may be necessary to spin the lens at an axis offset from the geometric center to avoid coating buildup at the segment line(s). Ophthalmic lenses having a base curvature less than 6 diopters are defined herein as low base lenses and lenses having a base curvature of 6 or higher are defined herein as high base lenses. The process of the invention may be used to coat lenses having a low or high base curvature. When coating high base lenses, the dispenser to substrate surface distance is within the desired range of 0.3 to 0.6 inch at least 90% of the time, more preferably, at least 95% of the time and most preferably, 99% of the time while moving over the substrate surface.

Most particularly contemplated, is the use of the process of the present invention to produce photochromic optical articles either having the photochromic polymeric coatings on the optical elements or using the photochromic polymeric coating to imbibe the photochromic compounds into the optical element. Coated articles may be prepared by sequentially applying to the optical element a primer, the photochromic polymeric composition and appropriate protective coating(s). The resulting cured coating preferably meets commercially acceptable "cosmetic" standards for optical coatings, and most preferably, is substantially free of cosmetic defects.

Optical elements having imbibed photochromic compounds may be prepared by applying to the optical element a photochromic polymeric coating by the process of the present invention, drying the coating, i.e., heating the coated substrate for a duration and intensity that should be sufficient to obtain thermal transfer (permeation) of the photochromic substances to the desired depth in the substrate, and removing the residual photochromic substances depleted coating thereby leaving a photochromic amount of the photochromic substance entirely disposed beneath the surface of the substrate.

The present invention is more particularly described in the following examples, which are intended as illustrative only, since numerous modifications and variations therein will be apparent to those skilled in the art.

EXAMPLE 1

Aspheric lenses having a base curvature of 2.5 diopters and a diameter of 75 mm or 6.5 diopters and a diameter of 74 mm and semi-finished single vision lenses having a base curvature of 8.5 diopters and diameter of 74 mm were used in this example. Prior to application of the coating, each lens was washed with detergent and rinsed with water.

A polyurethane formulation containing photochromic compounds, which color to gray upon activation with ultraviolet light, was supplied under pressure, i.e., from about 10 to 20 pounds per square inch (psi) ($6.89 \times 10^4$ to $1.38 \times 10^5$ Newtons per meter$^2$ (N/m$^2$)) to a Nordson Select Coat® Slim Swirl Applicator (SC-200). The applicator was also connected to an air line supplying air at about 2.5 psi ($1.72 \times 10^4$ N/m$^2$). A Nordson swirl nozzle having an inside diameter of 0.020 inches (0.51 mm) was used in the applicator. The applicator was mounted on a robotic arm capable of moving the applicator horizontally along the X axis, i.e., the rotation axis, and vertically along the Y axis, i.e., the height axis. The micro-adjust cap on the applicator was opened 1 turn from the fully closed position.

A PLC, specifically an Allen Bradley SLC-500 having CPU 5/04, controlled the rotation of the lens holder and the position of the Nordson SC-200 dispenser through serial communication and controlled, as discrete I/O components, the spraying of the coating material and the movement of the robotic arm supplying and removing lenses from the lens holder. A computer capable of running RS View software from Rockwell Software was connected to the PLC and served as an interface for inputting instructions for the operation of the various components. Upon activation of the system a lens was supplied to the holder attached to the end of a rotatable spindle. The lens holder and spindle were housed within an open cup-like receptacle that prevented the polyurethane formulation that was spun off of the lens from coating the processing equipment. Rotation of the lens holder and application of the polyurethane formulation were completed according to the specifications listed in Table 1. The coated lenses were removed from the lens holder and cured at 130–145° C. for 30 to 90 minutes. The resulting lenses had a uniform coating of about 20 microns. The aforedescribed coating, spinning and transferring operations were conducted in a Class 10 enclosure.

The positions for the robotic arm in the X and Y axes listed in Table 1 have no real measurable units. They describe the location of the robotic arm in reference to a "home" position for the arm. By following these positional directions, the robotic arm keeps the applicator's nozzle at a distance of from about 0.375 to 0.5 inch (0.95 to 1.27 cm) from the surface of the lens. The values listed in Table 1 for the speed to move from center to edge also have no real measurable units. Higher numbers move the arm faster and vice versa. Table 1 also lists the amount of polyurethane formulation applied as the dispensed weight, the amount remaining on the lens as the film weight and the percentage lost which was calculated by the following formula:

$$\frac{\text{Dispensed Weight} - \text{Film Weight}}{\text{Dispensed Weight}} \times 100$$

TABLE 1

| Lens base curvature (diopters) | 2.5 | 6.5 | 8.5 |
|---|---|---|---|
| First spin speed (rpm) | 400 | 430 | 430 |
| Time for first spin (seconds) | 5.5 | 5.0 | 5.2 |
| Second spin speed (rpm) | 1200 | 1300 | 1380 |
| Time for second spin (seconds) | 4.2 | 3.9 | 4.4 |
| Center position height (Y axis) | 920 | 910 | 890 |
| Edge position height (Y axis) | 960 | 1000 | 1000 |
| Speed to move from center to edge height (Y axis) | 20 | 30 | 30 |
| Center position horizontal (X axis) | 375 | 375 | 375 |
| Edge position horizontal (X axis) | 465 | 465 | 465 |
| Speed to move from center position to edge position (X axis) | 20 | 25 | 25 |
| Dispensed weight (grams) | 0.450 | 0.465 | 0.467 |
| Film weight (grams) | 0.236 | 0.237 | 0.238 |
| Percentage lost | 48 | 49 | 49 |

The results of Table 1 show that the lenses coated in Example 1 had a loss of approximately 49% of the applied coating. In a typical coating operation using an EFD needle valve, Model 740 V-SS, fitted with a nozzle having an inside diameter of 0.033 inches (0.84 mm), dispensing 1 gram of the polyurethane formulation of Example 1 in a stream from a distance of 0.0625 inch (0.16 cm) above the center of a lens spinning at 1400 rpm for 3.5 to 4 seconds and spinning at a second speed, after completing the dispensing, of from 1800 to 1900 rpm for 2 to 2.5 seconds, there was an average loss of about 75 to 80% of the applied coating.

EXAMPLE 2

The procedure of Example 1 was followed except that 78 mm in diameter lenses having a base curvature of 3.75, 5.5, 6.5 and 7.5 diopters that had been edged were used; a photochromic imbibition coating formulation comprising hydroxypropyl cellulose and photochromic compounds that color brown upon exposure to ultraviolet light was used in place of the polyurethane formulation; the coating formulation was pressurized to about 20 to 30 psi ($1.38 \times 10^5$ to $2.07 \times 10^5$ N/m$^2$); the applicator was connected to an atomizing air supply of from 10 to 15 psi ($6.84 \times 10^4$ to $1.03 \times 10^5$ N/m$^2$); a Nordson swirl nozzle having an inside diameter of 0.030 inch (0.76 mm) was used; the specifications of Table 2 were followed; and results were averaged for duplicate tests except for the 7.5 base curve lenses which were done in triplicate.

After coating, the lenses were flash dried for 30 minutes with each lens reaching a temperature of from 30 to 50° C., heated to a lens temperature of 115 to 145° C. that was maintained from 2 to 6 hours; and subsequently cleaned to remove the imbibition coating. Each lens was exposed to ultraviolet light and demonstrated a photochromic response, i.e., a change from colorless to brown. The percentage of the imbibition formulation lost is listed in Table 2.

TABLE 2

| Lens base curvature (diopters) | 3.75 | 5.5 | 6.5 | 7.5 |
|---|---|---|---|---|
| Spin acceleration (increase in rpms per second) | 2500 | 2500 | 2500 | 2500 |
| First spin speed (rpm) | 315 | 315 | 315 | 315 |
| Time for first spin (seconds) | 3.9 | 3.9 | 3.9 | 3.9 |
| Second spin speed (rpm) | 1600 | 1600 | 1600 | 1600 |
| Time for second spin (seconds) | 3.0 | 3.0 | 3.0 | 3.0 |
| Spin deceleration (decrease in rpms per second) | 1000 | 1000 | 1000 | 1000 |
| Center position height (Y axis) | 975 | 950 | 950 | 935 |
| Edge position height (Y axis) | 995 | 990 | 990 | 1000 |
| Speed to move from center to edge height (Y axis) | 50 | 50 | 50 | 50 |
| Center position horizontal (X axis) | 300 | 300 | 300 | 300 |
| Edge position horizontal (X axis) | 367 | 367 | 365 | 365 |
| Speed to move from center position to edge position (X axis) | 50 | 50 | 50 | 50 |
| Dispensed weight (grams) | 0.466 | 0.469 | 0.482 | 0.500 |
| Film weight (grams) | 0.400 | 0.401 | 0.403 | 0.423 |
| Percentrage lost | 14.2 | 14.5 | 16.4 | 15.4 |

Comparative Example

The procedure of Example 2 was followed except that an EFD needle valve, Model 725 DA-SS, fitted with a nozzle having an inside diameter of 0.063 inches (0.16 cm), was used in place of the Nordson SC-200; the specifications of Table 3 were followed; and the results for the 7.5 base curve lens were based on the analysis of an individual lens. The percentage of the imbibition formulation lost is also listed in Table 3.

TABLE 3

| Lens base curvature (diopters) | 3.75 | 5.5 | 6.5 | 7.5 |
|---|---|---|---|---|
| Spin acceleration (increase in rpms per second) | 2500 | 2500 | 2500 | 2500 |
| First spin speed (rpm) | 155 | 315 | 315 | 315 |
| Time for first spin (seconds) | 2.75 | 3.9 | 3.9 | 3.9 |
| Second spin speed (rpm) | 2800 | 1600 | 1600 | 1600 |
| Time for second spin (seconds) | 2.65 | 3.0 | 3.0 | 3.0 |
| Spin deceleration | 1500 | 1000 | 1000 | 1000 |

TABLE 3-continued

| | | | | |
|---|---|---|---|---|
| (decrease in rpms per second) | | | | |
| Center position height (Y axis) | 1018 | 950 | 950 | 935 |
| Center position horizontal (X axis) | 300 | 300 | 300 | 300 |
| Dispensed weight (grams) | 0.538 | 0.599 | 0.616 | 0.629 |
| Film weight (grams) | 0.401 | 0.401 | 0.403 | 0.421 |
| Percentage lost | 25.5 | 33.1 | 34.6 | 33.1 |

The results of Tables 2 and 3 show that the percentage lost by lenses coated in Example 2, when combined and averaged, was about 50% less than the amount lost by the lenses coated in the Comparative Example.

The present invention has been described with reference to specific details of particular embodiments thereof. It is not intended that such details be regarded as limitations upon the scope of the invention except insofar as to the extent that they are included in the accompanying claims.

We claim:

1. A process for coating a surface on a spinning substrate wherein a liquid coating material is dispensed onto said surface of said spinning substrate through a dispenser radially from the center to the edge or from the edge to the center above the surface, and after application of the coating material the coating is cured, wherein the improvement comprises:

dispensing said liquid coating material through a nozzle in said dispenser onto said substrate, wherein said substrate to be coated has a curved surface having a base curvature other than 0, to produce a circular spray pattern of said dispensed liquid having an outside diameter of up to 1.2 inches while maintaining the dispenser nozzle at a constant distance from 0.3 to 0.6 inch from the curved surface of the substrate for substantially the entire distance from the center to the edge or from the edge to the center of the curved surface of the substrate, thereby reducing the amount of coating material used.

2. The process of claim 1 further comprising the step of applying and curing a protective coating.

3. The process of claim 1 wherein the liquid coating material contains a photochromic amount of photochromic compound(s).

4. The process of claim 3 further comprising the step of drying, heating for a time sufficient to incorporate a photochromic amount of the photochromic compound(s) into said substrate and thereafter removing the photochromic-depleted coating from said surface.

5. The process of claim 1 wherein the substrate having a curved surface is an optical element.

6. The process of claim 5 wherein the optical element is a lens.

7. The process of claim 1 wherein the diameter of the nozzle ranges from 0.008 to 0.030 inch.

8. The process of claim 1 wherein the liquid coating material is dispensed under a pressure of from 1 to 3 pounds per square inch.

9. The process of claim 1 wherein the liquid coating material is dispensed under a pressure greater than 10 pounds per square inch.

10. The process of claim 1 wherein the pattern has an outside diameter of up to 1.0 inch.

11. The process of claim 10 wherein said dispenser nozzle is maintained 0.37 to 0.50 inch from the substrate surface.

12. The process of claim 1 wherein the pattern has an uncoated inside circular region of 0.4 inch.

13. The process of claim 1 wherein the dispenser nozzle is maintained at an angle ranging from perpendicular to the substrate to 45 degrees from perpendicular to the substrate.

14. The process of claim 1 wherein said process is conducted in an enclosure in which the temperature, relative humidity and dirt level are controlled.

\* \* \* \* \*